April 27, 1948.  D. D. GRIEG  2,440,263

MONITORING CIRCUIT

Filed Sept. 18, 1942  5 Sheets-Sheet 1

INVENTOR
DONALD D. GRIEG
BY
ATTORNEY

April 27, 1948. D. D. GRIEG 2,440,263
MONITORING CIRCUIT
Filed Sept. 18, 1942 5 Sheets-Sheet 2
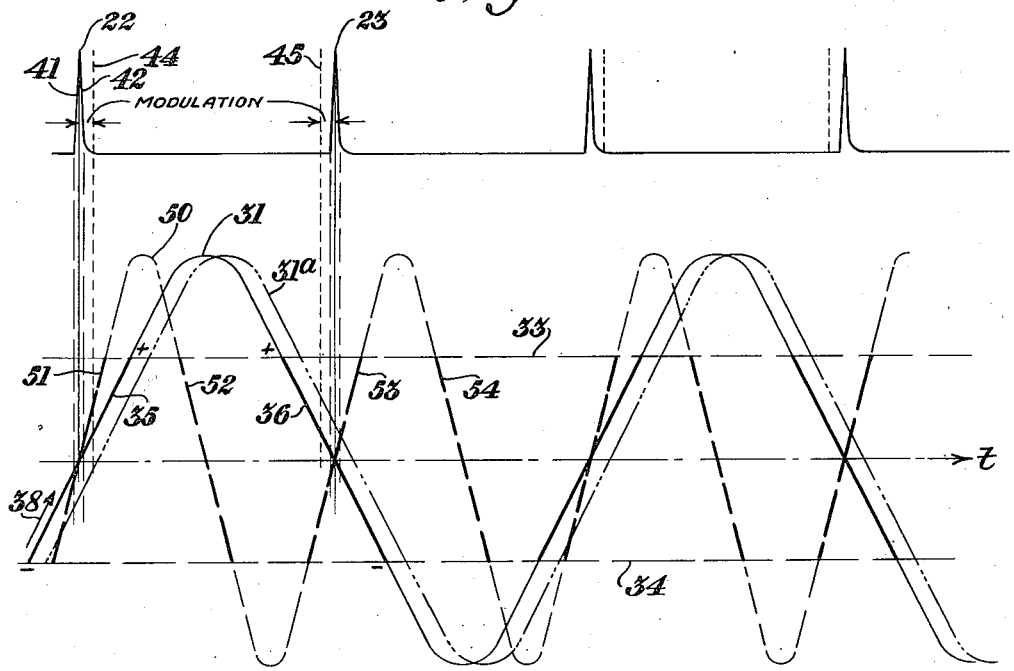
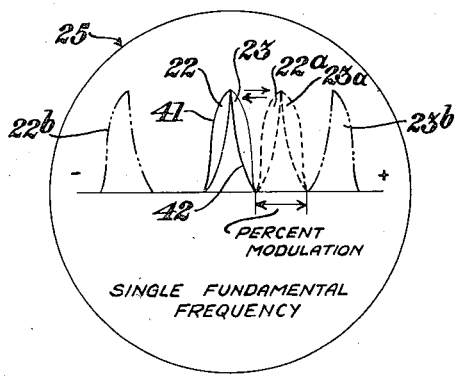
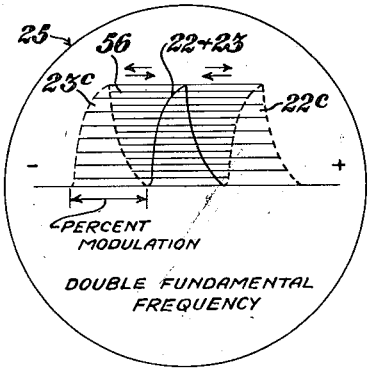
INVENTOR
DONALD D. GRIEG
BY
ATTORNEY April 27, 1948.   D. D. GRIEG   2,440,263
MONITORING CIRCUIT
Filed Sept. 18, 1942   5 Sheets-Sheet 3

INVENTOR
DONALD D. GRIEG
BY Percy P. Lantzy
ATTORNEY

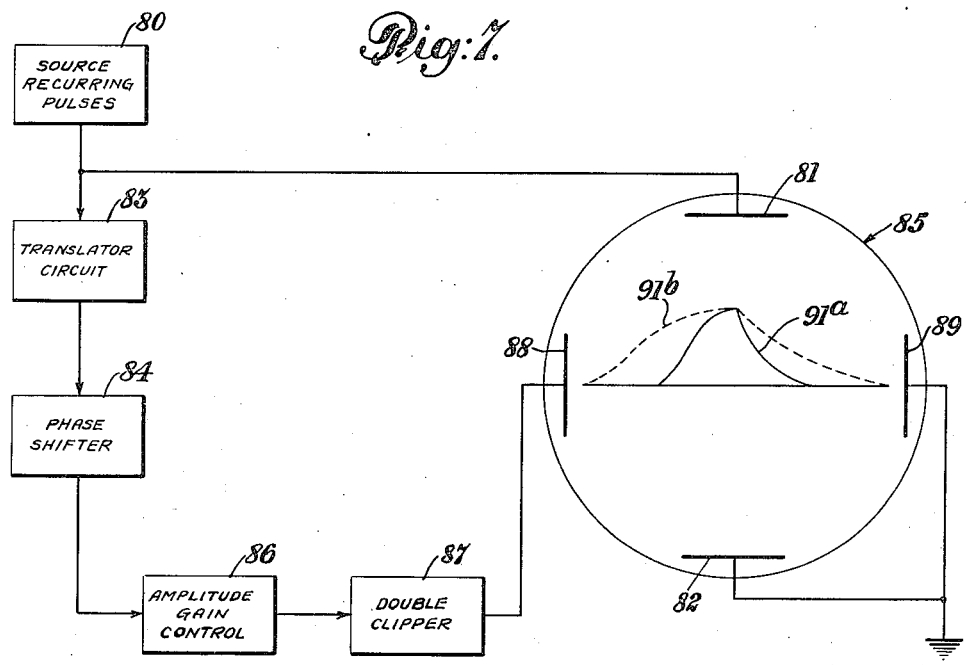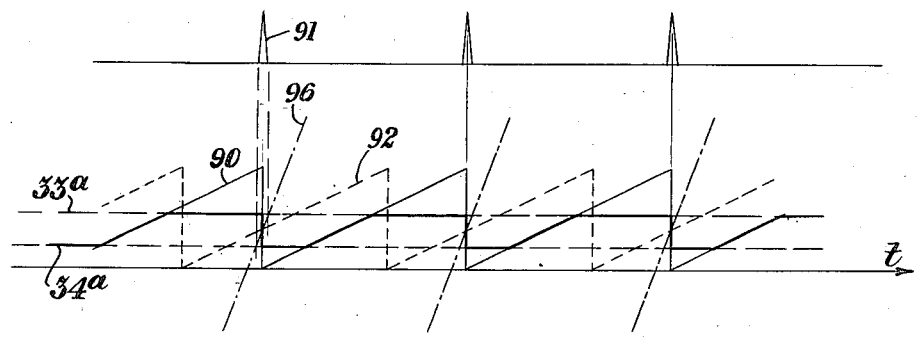

April 27, 1948.                    D. D. GRIEG                    2,440,263
                              MONITORING CIRCUIT
                     Filed Sept. 18, 1942         5 Sheets-Sheet 5
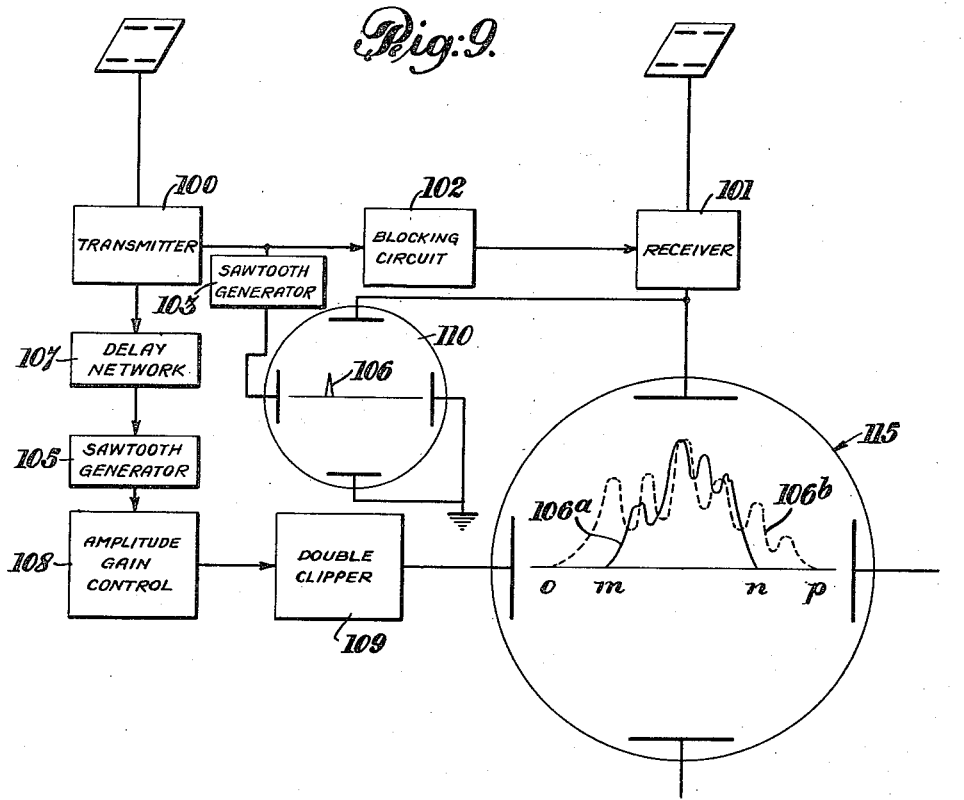
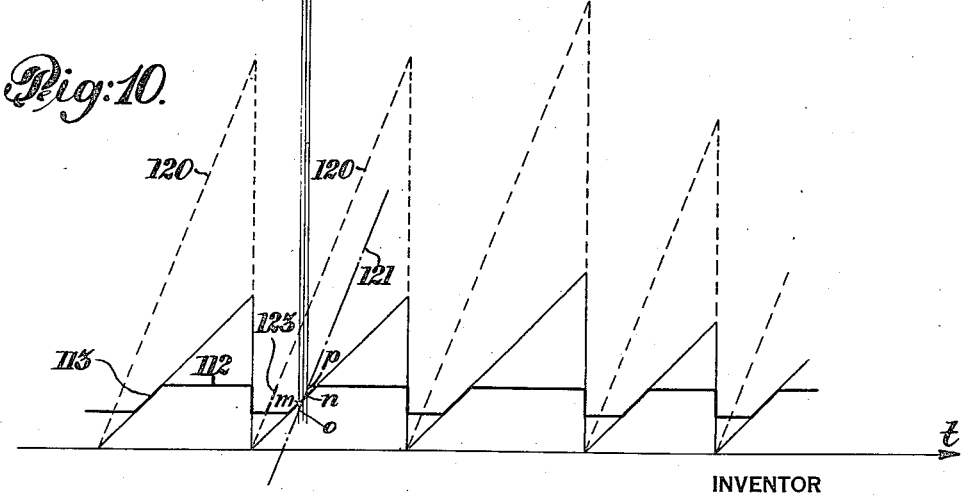
INVENTOR
DONALD D. GRIEG
BY
ATTORNEY Patented Apr. 27, 1948

2,440,263

UNITED STATES PATENT OFFICE 2,440,263

MONITORING CIRCUIT

Donald D. Grieg, Forest Hills, N. Y., assignor to Federal Telephone and Radio Corporation, a corporation of Delaware Application September 18, 1942, Serial No. 458,853

12 Claims. (Cl. 315—24)

This invention relates to radio pulse modulating and obstacle detection systems and more particularly to means for expanding pulses which may be used in such systems or for other purposes, so that the shapes thereof can be easily studied and/or compared with other pulse shapes.

Examples of pulse modulation systems to which this invention may be applied are disclosed in United States patents to A. Reeves Nos. 2,266,401 and 2,256,336; United States patent to E. Deloraine and A. Reeves No. 2,262,838; and in a copending application of E. Deloraine and E. Labin, Serial No. 425,108, filed December 31, 1941, which discloses both amplitude and time modulation of pulses, both forms of modulation being performed, for example, by pairs of pulses.

Examples of obstacle detection systems are disclosed in the copending applications of H. Busignies, Serial No. 381,640, filed March 4, 1941, and Serial No. 417,151, filed October 30, 1941, now abandoned; E. Labin, Serial No. 433,762, filed March 7, 1942 issued as Patent 2,419,566 April 29, 1947; and E. Labin and D. Grieg, Serial No. 437,530, filed April 3, 1942. These obstacle detection systems disclose methods and means for detecting the location of obstacles by identifying their distance and direction with respect to the locating apparatus and they operate according to the pulse principle wherein ultra high frequency impulses are intermittently radiated and the echo of such radiation is examined by the apparatus to locate the obstacle causing the echo.

Electrical pulses used for pulse modulation systems are preferably of very narrow shape and when viewed on the usual cathode ray oscillograph appear as straight lines. In such form, one cannot observe small irregularities or variations in the pulse shape nor is it possible to observe modulation of the pulses since for even 100% pulse modulation, the pulses will move in only about one to two microseconds and such movement results in only a very slight fuzzing of the pulse as viewed on the oscillograph.

It is one of the objects of this invention to provide a method and means for greatly expanding electrical pulses so that the formation thereof may be easily studied and monitored.

Another object of this invention is to provide a method and means whereby two or more pulses which are used together for time and/or amplitude modulation purposes may be reproduced on an oscillograph so that they can be checked and compared and the degree of modulation determined.

The method of expanding the outline shape of a pulse as viewed upon the screen of a cathode ray oscillograph involves first the production or the procurement of a wave synchronized to the frequency of pulse occurrence. The wave is preferably of the character having regularly recurring, substantially linear, inclined portions such, for example, as the inclined portions adjacent the zero axis of a sinusoidal wave. The wave thus procured is then subjected to a clipping process such as passing the wave through a gate of constant magnitude to thereby segregate a portion between two points a short distance apart along the inclined portions thereof. The inclined portions thus clipped from the wave are used as the sweep potential for the oscillograph. The pulses to be expanded are applied to the oscillograph at right angles to the sweep potential. The degree of expansion of the pulse depends upon the inclination of the inclined portions of the wave form used as the sweep potential. This inclination may be varied by varying the amplitude of the wave prior to the clipping operation, but the clipping of the wave determines the sweep potential for different inclinations of the clipped portions. The inclination of the inclined portions may be such as to expand the pulse which normally would appear as a straight line, the full width of the oscillograph screen and even further. Where the pulse is expanded further than the width of the screen, the structure of either the wave front, the trailing side or the central top portion of the wave may be viewed in greatly magnified proportions. To bring any portion of the expanded pulse for view on the oscillograph, the phase of the wave used can be shifted as desired.

Where my method is used for monitoring pulses of a pulse modulation system, the source of the sweep circuit wave may be the same as that of the wave used as a carrier for the pulses. In modulation systems in which modulation results in moving the pulses by pairs of pulses nearer together or farther apart, it is desirable to make the two pulses of the pair identical for accurate detection of signals. The fundamental frequency of the wave source may be used for the sweep potential or the wave frequency may be doubled. Where the fundamental is used, the pair of pulses when centered on the screen by a selected phase adjustment appear superimposed. The pulses face in opposite directions and the time modulation thereof for such phase adjustment causes the two pulses to move together in the same direction. The pulse images, however, may be separated by changing the phase adjustment. When double the fundamental frequency is used, the pulses face in the same direction but move in opposite directions when modulated. For one phase adjustment, the pulses are brought into coincidence. In this position, the symmetry and balance of the pulses can be compared with precision and if one is of a shape different from the other, the pulse generator may be adjusted to overcome the difference. The maximum displacement assumed by the pulses during modulation will indicate on the screen the percentage of modulation.

Where the method is used for expansion of pulses such as the echo pulses produced on the oscillograph of an obstacle detection apparatus, a wave may be generated in response to the detector impulses transmitted by the apparatus, the wave, whether sinusoidal or of the saw-tooth form, may thereafter be clipped as described above to produce a constant peak amplitude for the inclined wave portions to be used for the sweep potential. The echo pulses received by the detection apparatus are applied at right angles to the sweep potential and the shape of the pulse may be easily determined by adjusting the gain of the wave amplifier used to produce the sweep potential. In this connection, an expansion of the echo pulse will often indicate peculiar irregularities which may correspond to certain irregularities in the shape of an obstacle or the number of obstacles causing the echo. Thus if the obstacle is a battleship having a certain irregular superstructure, this irregularity will, in a sense, appear in the echo pulse shape, especially if the ship is travelling in a direction toward or away from the location of the detection apparatus. In the case of a squadron of airplanes causing the echo pulse, an expansion of the pulse will reveal that it is made up of a number of closely disposed pulses, the number of which can then be determined with a fair degree of accuracy. Thus the approximate number of airplanes in the detected squadron can be determined. It will therefore be clear that by expanding the echo pulses, irregularities caused by the reflecting obstacles may be detected and the general character and quantity of the obstacles determined.

For a further understanding of the invention, reference may be had to the following detailed description to be read in connection with the accompanying drawings, in which, Fig. 1 is a schematic block diagram of a pulse modulating system incorporating a form of pulse monitoring system in accordance with this invention;

Fig. 2 is a graphical representation illustrating the pulse expansion feature of the invention;

Figs. 3 and 4 are views of an oscillograph screen showing modulated pulses expanded in accordance with this invention;

Fig. 7 is a schematic block diagram of another form of system by which recurring pulses generally can be monitored in accordance with this invention;

Fig. 8 is a graphical representation of recurring pulses and sweep potential in accordance with the system shown in Fig. 7;

Fig. 9 is a schematic block diagram of an obstacle detection apparatus incorporating the principles of this invention; and Fig. 10 is a graphical illustration of detector and echo pulses and the relationship thereof with respect to the sweep potential used in the system of Fig. 9.

Figure 1:
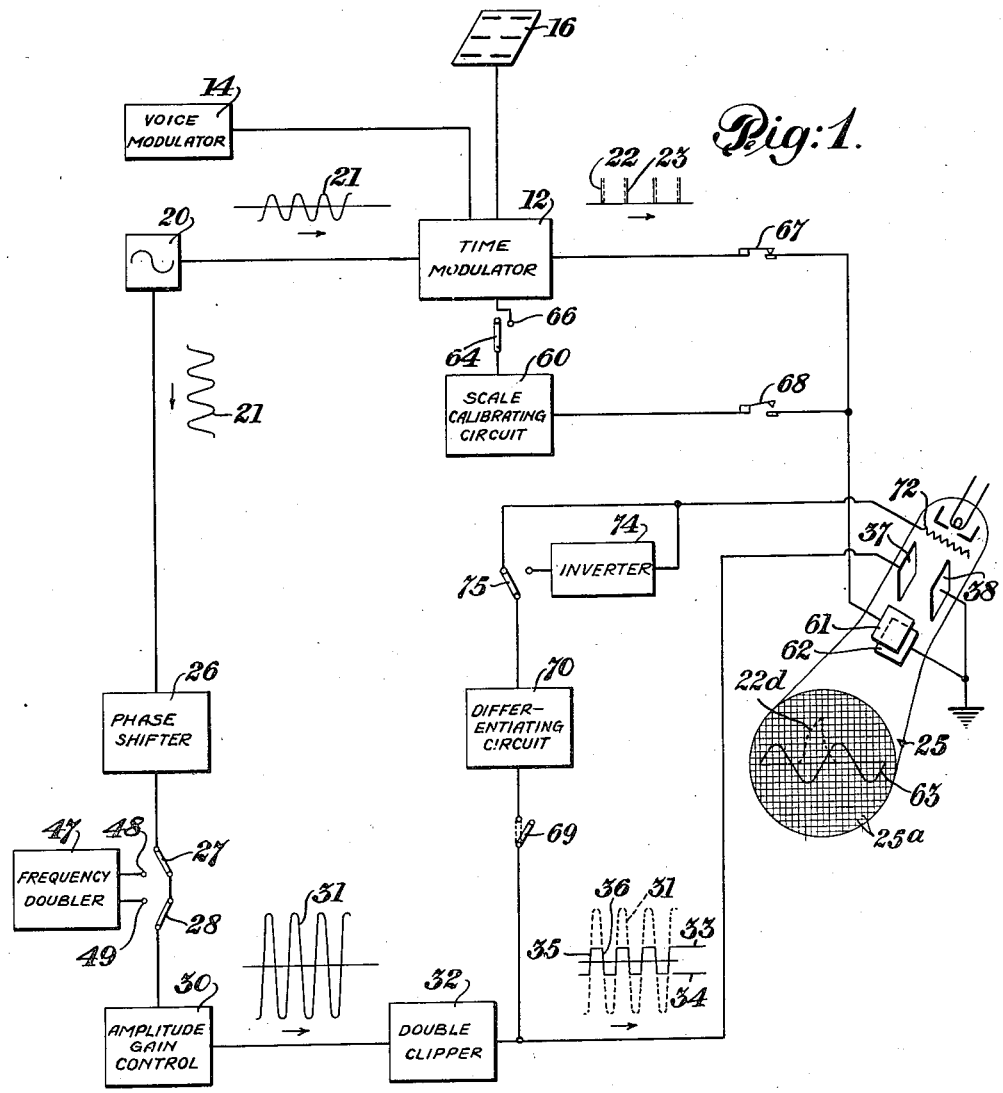

Referring to Fig. 1 of the drawings, I have shown a time modulator 12 provided with a monitoring system in accordance with this invention. The time modulator 12 is preferably of the character disclosed in the copending application of E. Deloraine and E. Labin Serial No. 425,108, filed December 31, 1941, and may therefore include a full wave rectifier, double differentiating circuits with limiters for generation of regular recurring pulses and time modulating circuits to modulate the pulses in pairs in respect to time in accordance with voice or other modulating signals. The aforementioned application Serial No. 425,108 also discloses means for amplitude modulation in addition to and simultaneously with time modulation. While this invention may be used to monitor pulses when amplitude modulation is performed, I shall describe the invention for purposes of illustration and sake of brevity in connection with time modulation.

The time modulator 12 is provided with a voice modulator 14 and an antenna 16 for transmission purposes. A source 20 of sinusoidal energy 21 is provided for the time modulator 12 and the pulses 22, 23 are generated therefrom in the time modulator. The broken lines adjacent the pulses 22, 23 represent the sense of time modulation, that is to say, the pulses of a pair are modulated toward each other from their equally spaced positions. It will be understood, of course, that the modulation may comprise movement of one pulse relative to the other of a pair or the pulse of a pair may move away from each other from their equally spaced positions.

In accordance with this invention, the time modulator 12 has connected therewith an oscillograph 25 by which the shape of the pairs of pulses may be examined or monitored and the percentage modulation thereof determined. This is accomplished by using the source 20 of sinusoidal wave form 21 as the source of energy to provide the sweep potential for the oscillograph 25. The source of sinusoidal current may, for example, be 6 kilocycles as proposed in the aforesaid application Serial No. 425,108. Energy from the source 20 is passed through a phasing device 26 and thence through switches 27 and 28 for passage through a known form of amplitude gain control 30 whereby the sinusoidal wave 21 may be amplified as desired. The wave form 31 from the output of the control 30 is passed through a constant magnitude "gate" or double clipper 32 such as disclosed in the aforesaid copending application Serial No. 437,530 whereby a narrow strip is clipped from the center portion of the wave form. This clipping is preferably taken at spaced points above and below the center line or zero axis of the sinusoidal wave, as illustrated by the lines 33 and 34 (Figs. 1 and 2). This results in a trapezoidal wave form, the sides of each trapezoid comprising substantially linear inclined lines of potential. This wave which may be amplified to a desired potential required to cause the beam to trace the effective width of the screen is applied to the horizontally disposed plates 37 and 38 of the oscillograph 25.

The inclined lines 35 and 36 thus provide the sweep potentials for the oscillograph. By keeping the "gate" amplitude constant and increasing the amplitude of the wave, the sweep timing is decreased, thereby increasing the degree of pulse expansion.

The clipper "gate" 32 may be adjusted so that the complete input wave is passed and where the inclination of the inclined portions is varied by changing the frequency of the wave 21 as hereinafter described. In this case, however, where the amplitude of this wave is varied, accompanying disadvantages are obtained, such as, for example, a varying maximum potential for the sweep circuit of the oscillograph.

Referring more particularly to Fig. 2, the pulses 22 and 23 which form pulse pairs are shown disposed in a selected centered timed relation with the inclined portions 35 and 36.

The wave shapes of the pulses 22 and 23 traced on the oscillograph screen through the cooperation of a sweep potential derived from the inclined portions 35 and 36 are shown in Fig. 3. Assuming that the sweep is from left to right as viewed in Fig. 3 and the first sweep will be the line 35 as indicated by the arrow 38. This sweep will trace the shape of the pulse 22, the wave front 41 of which is first formed and then the trailing portion 42. At the upper end of the inclined portion 35 of the trapezoidal sweep wave, as determined by the line 33, the sweep potential remains constant and the oscillograph beam stationary until the potential descends along the inclined portion 36 whereupon the beam returns from right to left as viewed in Fig. 3. This return sweep traces the shape of the pulse 23, the pulse shape being in reverse relation to the pulse shape 22. The pulse shapes are thus shown facing in opposite directions and for this pulse centering phasing position are in overlying relation. This relationship of the pulse shapes makes for a symmetrical figure and the corresponding parts of the two pulses can be compared and monitored. When the pulses are time modulated toward each other as indicated by the broken lines 44 and 45 in Fig. 2, the pulse shapes move together. For the positions 44 and 45 (Fig. 2) the pulses 22 and 23 will move to the positions indicated by broken lines 22a and 23a.

The time modulation indicated by lines 44 and 45 is exaggerated for purposes of illustration. One hundred percent modulation as determined by the pulse modulator for transmission purposes may be, for example, about one or two microseconds only, while the time between the regularly spaced pulses 22 and 23 may be about 80 microseconds. The percentage modulation may be observed and determined by measuring the distance between the wavefront traces of one of the pulses.

To spread apart the pulse shapes 22 and 23 for individual examination, the phase of the wave 31 may be changed by adjusting the phase shifter 26, thus moving the phase position of the wave to 31a. The electron beam traces in a different time relation with respect to the pulses 22 and 23 thereby separating the pulse shapes thereof as indicated by the positions 22b and 23b. The distance of separation may, of course, be varied by adjustment of the phase shifter 26. While the pulse shapes appearing on the screen of the oscillograph in Fig. 3 can be compared and monitored, the pulse shapes may be further checked and monitored by doubling the frequency of the wave used for the sweep potential. Referring back to Fig. 1 of the drawings, I provide a known form of frequency doubler 47. The circuit connection for the frequency doubler 47 is provided with contacts 48 and 49 for connection with the switches 27 and 28 whereby the wave 21 can be passed through the frequency doubler and the frequency of the wave doubled as indicated by the wave 50 (Fig. 2). The wave 50 when passed through the double clipper 32 provides twice as many inclined portions 35 and 36 as the fundamental waveform 21, for the same time interval. These inclined portions formed by the curve 50 are indicated by the reference characters 51, 52, 53 and 54. Following the sweep of the portion 51 from left to right, as viewed in Fig. 2, the shape of the pulse 22 will appear on the oscilloscope 25 as shown in solid lines in Fig. 4. The sweep as determined by the inclined portion 52 constitutes a return from left to right in Fig. 4, and since neither of the pulses are in phase with this portion of the sweep, no pulse shape will result. The third sweep as determined by the portion 53, however, traces the pulse shape 23, but since the pulse 23 for the phase relation shown is directly in phase with the center point of the portion 53, which is identical to the phase position of the pulse 22 to the inclined portion 51, the resulting pulse shape 23 will coincide with the pulse shape 22. This relationship enables an operator to compare the two pulses and adjust the apparatus so that the two pulses are identical.

To trace the pulses 22 and 23 for their corresponding modulated positions as indicated by the broken lines 44 and 45, Fig. 2, the pulses will appear on the oscillograph in the broken line positions indicated by 22c and 23c. By measuring the distance between the wave fronts of the pulse positions 22 and 22c or 23 and 23c, the percentage modulation may be determined. The latter position for percentage modulation measurement, however, is preferred since as seen by the glow 56 caused by the time modulation, the outline of the wave front of pulse shape 23c will be clearer than the wave front of the pulse shape 22c. For percentage of amplitude modulation, a vertical measurement between peaks of amplitude position may be taken.

It will be apparent from Fig. 2 that the wave form 50 for the same amplitude as the wave 31 has steeper inclined portions than the wave form 31. This increased inclination results in a greater expansion of the pulses 22 and 23 as indicated by a comparison of the pulse shapes shown in Figs. 3 and 4. Should it be desirable to further expand the pulse shapes, this may be done by increasing the amplitude of the wave passing through the gain control 30 (Fig. 1). This variation or adjustment of pulse shape expansion by amplitude control is described in more detail hereinafter. As indicated by a comparison of the fundamental wave 31 and the double frequency wave 50, pulse shape expansion may be obtained without changing wave amplitude by changing the frequency thereof. Also, different frequencies may be used for skipping alternate pulses when it is desired to examine individual pulses. That is, the frequency and plate adjustment may be such as to have the return sweep occur between pulses. Also, the effective sweeps may be so correlated as to provide mirror reflection of say every fifth or seventh pulse, etc., of a train of pulses. This, of course, will require a frequency divider in the place of a frequency doubler or multiplier. Furthermore, by dividing the frequency, a longer flat top can be obtained for the trapezoid sweep potential wave.

For the purpose of monitoring the pulses and for determination of the widths of pulses, it is desirable to calibrate the screen of the oscillograph 25. This I accomplish by providing a scale calibrating circuit 60 which may receive and apply to the vertically disposed plates 61 and 62 of the oscillograph, a sine wave 63 excited by the pulses 22, 23 but whose period is determined solely by the constants of calibrating circuit 60. The number of screen squares 25a expanded by a cycle of the wave 63 may thus be determined. Knowing the frequency of the wave 63, the width of pulse 22d or percentage of modulation can be determined by using in a simple comparison equation the number of squares expanded by the wave cycle, the pulse width or the pulse movement as the case may be.

If desired, a pulse indicating scale may be provided in accordance with the scale calibration system disclosed in the copending application of H. Busignies, Serial No. 458,191, filed September 14, 1942. When either form of scale calibration is used, pulses generated in the time modulator 12 prior to voice modulation thereof may be used as the exciting pulse energy for the scale calibrating circuit by closing the contact 64 with the contact 66. When the screen of the oscillograph 25 is being calibrated, the time modulator may be disconnected from the plate 61 by opening a switch 67. A switch 68 is provided whereby the scale calibrating circuit may be temporarily connected for calibrating purposes.

It may be desirable for examination of one of the pulses such as where the fundamental frequency only is used to remove from the screen the other of the pulse shapes of a pair. This may be done by closing a switch 69 thereby connecting in circuit a known form of differentiating circuit 70 (Fig. 1) whereby the sweep potential is differentiated and the resulting potential applied to the grid 72 of the cathode ray oscillograph 25. This arrangement normally extinguishes one of the sweeps. The result is the tracing of a single pulse shape, that is, only one of the pulses 22 or 23 will appear on the screen. A tracing of the other of the two pulses can be had by passing the potential through a phase inverter 74 by changing position of switch 75 before applying the potential to the grid 72. By providing the circuit 70 with a full wave rectifier, the pulses may be superimposed similarly as indicated in solid line in Fig. 4. This brightens the outline of the pulse shape.

Figure 5:
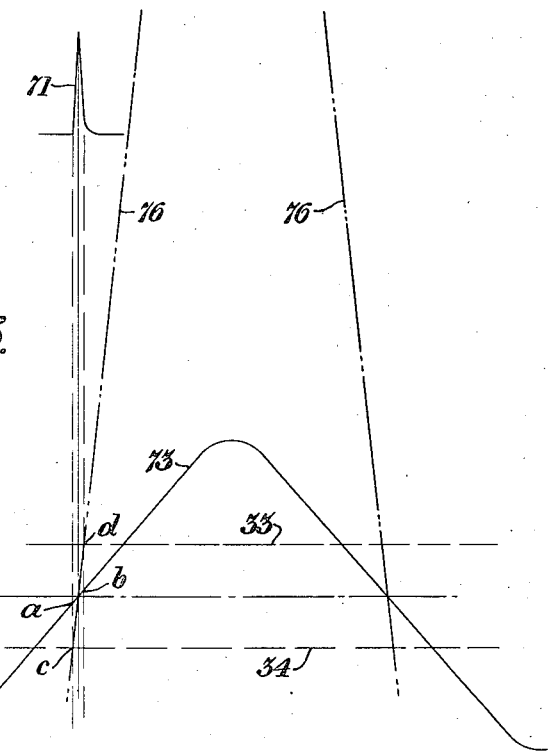
Fig. 5 is a graphical illustration of a sinusoidal curve wherein the amplitude thereof is varied to indicate the expanding effect of such variation on pulses.
Figure 6:
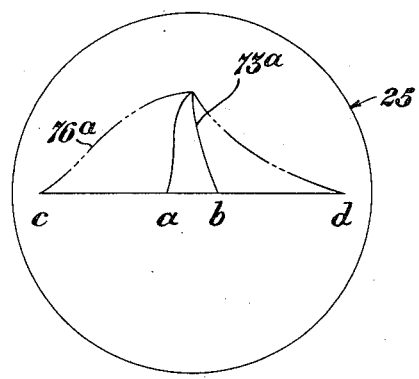
Fig. 6 is a view of the screen of an oscillograph showing a pulse and how it may be expanded to different proportions in accordance with the curves shown in Fig. 5.

Referring more particularly to Figs. 5 and 6, the operation of the amplitude gain control 30 will be further described. As the wave is increased in amplitude as indicated by the curves 73 and 76 it will be observed that the projected width of the pulse 71 on these curves increases in accordance to the steepness of the curve portions. The distance a—b for curve 73 represents the portion of the sweep potential which traces the pulse shape 73a on the screen of the oscillograph 25 (Fig. 6). The distance c—d on the curve 76 results in the pulse shape being expanded as indicated by the dot-dash line 76a.

From the foregoing, it is clear that the pulse shapes may be greatly expanded by increasing the amplitude of the wave which provides the sweep potential. It will be understood that the examples shown do not cover the extremes of the shape expansion feature of the invention but that the amplitude may be further increased so as to expand any desired portion of a pulse the full width of the oscillograph screen. This will enable an operator to examine closely the pulse shape for the irregularities that may cause noise in receiving apparatus. It will also be clear that this expansion feature of the invention may be used for comparing pulses received from an enemy source and those produced for jamming purposes and for misleading the enemy.

Another and more general application of this invention is the examination of any source of regularly recurring pulses. In Fig. 7, I have shown a modified form of the invention for this purpose. Pulse energy from the source 80 of regularly recurring pulses are applied to the vertically disposed plates 81, 82 of an oscillograph 85. The pulse energy is simultaneously applied from the source 80 to a translator circuit 83 which may comprise a known form of shock excitable tuned circuit or a known form of saw-tooth generator. If a shock excitable tuned circuit is used, the circuit will be tuned to either the fundamental frequency of the recurring pulses or a harmonic thereof. In the case of a saw-tooth generator, the pulses will be used to determine the initiation and termination of each saw-tooth.

The energy output of the translator circuit 83 is then applied to a phase shifter 84 whereby the sweep potential provided from this energy may be adjusted in accordance with the phase of the recurring pulses. An amplitude gain control 86 and a double clipping device 87 are provided which correspond in operation to the corresponding devices 30 and 32 described in connection with the form shown in Fig. 1. The resulting wave which, if selected as a clipped saw-tooth wave 90, is then applied to the horizontally disposed plates 88 and 89 of the cathode ray oscillograph 85.

In Fig. 8, the saw-tooth wave 90 generated by the translator circuit 83 is shown as developed in response to the pulses 91 from the source 80. The phase shifter 84 is used to adjust the inclined portion of the saw-tooth in phase relation with respect to the pulses 91 to be examined, as indicated by the broken lines 92. As an alternative to the phase shifter, the translator circuit may be adjusted to produce a saw-tooth wave twice the period of the pulses under observation. The clipper 87 is used to determine the amplitude potential of the sweep portion of the wave by means of gate limits 33a and 34a as described in connection with Figs. 1 and 2. This adjustment will then give on the oscillograph 85 a pulse shape such as 91a. If it is desirable to increase the degree of expansion of the pulse 91, the amplitude gain control 86 will be adjusted to obtain an inclination of the saw-tooth wave as indicated by the dash-dot line 96. The width of the pulse 91 will cover a greater distance on the inclination 96 thereby resulting in a more greatly expanded pulse shape 91b.

Fig. 9 illustrates still another application of the pulse shape expanding feature of this invention. Here I apply the invention to an obstacle detection apparatus which comprises the usual transmitting device 100, a receiver 101, and a blocking device 102 adapted to block operation of the receiver during the transmission of obstacle detecting impulses 104. The apparatus includes the usual cathode ray oscillograph 110 for detection of echo pulses. The sweep potential for the oscillograph 110 may be a known form of saw-tooth generator 103 controlled by the transmission of impulses 104 (Fig. 10). Apparatus of this character is disclosed in the aforesaid copending applications Serial Nos. 381,640, 417,151 and 433,762.

When an echo pulse 106 appears on the screen of the oscillograph 110 it may be desirable to examine closely the shape structure of the pulse. This is accomplished by using a saw-tooth wave produced by a generator 105 adjusted in delay by delay unit 107 and passed through an amplitude gain control 108 and a double clipper 109 corresponding to the devices 30 and 32 respectively as described in connection with Fig. 1, for use as sweep potential for a Vernier oscilloscope 115. Since the impulses 104 may not be of a steady frequency, the amplitude of the saw-teeth may not be constant. This amplitude variation, however, has no effect on the sweep potential since the double clipper 109 provides a constant amplitude wave as indicated by the heavy lines 112 (Fig. 10). Since each saw-tooth is initiated by a transmitter pulse 104, an adjustment of the delay network 107 may be necessary to move the inclined portion 113 of the sweep potential wave 112 into timed relation with the echo pulse 106. For the inclination of the portion 113, an expanded wave shape 106a having a base $m$—$n$ will appear on the oscillograph 115. If it is desirable to further expand the echo pulse, this may be accomplished by adjusting the gain control 108 to increase the inclination of the inclined portion 113 as indicated by the saw-tooth wave 120. In order to line up the inclined portion 123 of the curve 120 with the echo pulse 106, an adjustment of the delay network 107 is required. This shifted position is indicated by the line 121. The resulting pulse shape 106b is indicated as having a base $o$—$p$. The irregularity of the echo pulse shape will depend upon the reflecting surfaces of the obstacle or obstacles, as the case may be. In order to determine the nature of the obstacle, it will be necessary to send a pulse having a smooth shape. Should the obstacle be a battleship, the irregularity of the superstructure thereof may be detectable from certain irregularities appearing in the pulse shape. Should a squadron of airplanes cause the echo, it will probably show up on the oscillograph 115 as a single pulse 106. By expanding the pulse to the shape 106a it will be seen that there are a plurality of pulses closely positioned together. By expanding the pulse shape to the size 106b the group of pulses can be separated so that the number of airplanes or other obstacles causing the echo can be determined with a fairly high degree of accuracy. This detection of different types and closely grouped obstacles such as warships and aircraft by their echo pulse will in most instances, of course, require study and comparison with known echo shapes obtained by actual tests. The application of the pulse expansion principles to echo pulses in an obstacle detection system is disclosed in my copending application Serial No. 537,834, filed May 29, 1944, now abandoned, which is a division of the present application.

While I have shown and described several forms of the invention and a few of the applications thereof, I recognize that many variations in the apparatus and the method are possible as well as numerous additional applications of the features thereof. It will be understood, therefore, that the forms herein shown and described are to be regarded as illustrative of the invention only and not as restricting the appended claims.

What I claim is:

1. A method of monitoring the pairs of pulses of a pulse modulating system having a source of sinusoidal current, a generator forming recurring pairs of pulses in response to the sinusoidal current, means to time modulate said pairs of pulses and a cathode ray oscillograph; which method comprises clipping the sinusoidal wave a short distance above and below the center line thereof, using the inclined portions thus clipped from the sinusoidal wave to provide electrical sweep control for the oscillograph, the alternate inclined portions of the clipped wave constituting sweeps in opposed directions, and applying to the oscillograph at right angles to the electrical sweep control the energy of said pairs of pulses.

2. The method defined in claim 1 wherein sweeps in the same direction for both pulses are provided by doubling the frequency of the sinusoidal current.

3. The method defined in claim 1 wherein the inclined portions of the sweep potential portion of the wave are varied in spacing with respect to the spacing of the pulses by varying the frequency of the sinusoidal wave.

4. An electrical pulse viewing system comprising a cathode ray oscillograph, a source for producing an electrical wave having recurring inclined portions, means to clip from the wave a constant magnitude portion of said inclined portions, means to apply the energy of a source of recurring pulses to one set of deflecting plates of said oscillograph, and means to apply the clipped inclined portions as sweep potential to another set of deflecting plates of said oscillograph in timed relation with said recurring pulses, the inclination of said inclined portions being selected to give the desired degree of expansion of the pulse shape viewable on the oscillograph.

5. An electrical pulse viewing system comprising a cathode ray oscillograph, an electrical wave source, a source of recurring electrical pulses, said wave being in timed relation with respect to the timing of said pulses, said wave having recurring substantially linear inclined portions, means to pass the wave through a gate of constant magnitude thereby clipping the wave along two lines spaced a short distance apart and so disposed as to include corresponding parts of the recurring inclined portions, means for applying said clipped wave to the sweep circuit of said oscillograph so that said inclined portions act to cause the sweeping of the cathode ray, means for applying said electrical pulses to the oscillograph at right angles to the electrical sweep control to present pulse shapes, and means to vary the amplitude of said wave form so as to change the inclination of the inclined portions used as sweep control and thereby vary the expansion of the pulse shape appearing in the oscillograph.

6. In a time modulation system having a source of sinusoidal wave from which pairs of pulses are generated for time modulation; the combination therewith of a cathode ray oscillograph, means to pass the wave through a gate of constant magnitude thereby clipping the wave along two lines spaced a short distance above and below the center line of the wave to segregate therefrom short substantially linear inclined portions for use as electrical sweep control for the oscillograph, and means to apply the pulses generated by the modulation system to the oscillograph at right angles to the sweep control, the inclination of the inclined portions determining the expansion of the pulse shapes thereof so that they may be monitored and if the pulses are modulated to determine the percentage of modulation.

7. The system defined in claim 6 in combination with means to double the frequency of the wave form used to provide an electrical sweep control having a frequency such that the pair of pulses appear on the oscillograph for one position of modulation superimposed and having their wave fronts in the same direction.

8. The system defined in claim 6 in combination with means including a differentiating circuit connected between the output of the clipping means and the grid of the cathode ray oscillograph whereby only one of the pulse shapes appears on the oscillograph.

9. The system defined in claim 6 in combination with means using the source of sinusoidal wave form to calibrate the screen of the oscillograph.

10. In a time modulation system having a source of sinusoidal wave from which pairs of pulses are generated for time modulation; the combination therewith of a cathode ray oscillograph, means to shift the phase of the wave, control means to vary the amplitude of the wave, means to pass the wave through a gate of constant magnitude thereby clipping the wave at spaced points above and below the center line of the wave to segregate therefrom substantially linear inclined portions for use as electrical sweep control for the oscillograph, means to apply the pulses generated by the modulation system to the oscillograph at right angles to the sweep potential, the inclination of said inclined portions determining the degree of expansion of the pulse shapes appearing on the oscillograph, said phase shifting means being adapted to shift the sweep control portion of the wave in timed relation with the pulses, and said amplitude control means being adapted to vary the inclination of said inclined portions.

11. The method defined in claim 1 wherein the timing of the sweeps with respect to said pulses is selected so that the pulses of each pair are divided one for each of the opposing sweeps.

12. A system for viewing a series of recurring pulses of short duration which comprises an oscillograph, means for applying said pulses to the deflection circuit of said oscillograph, means for producing a wave having recurring inclined portions corresponding in frequency to the repetition rate of the pulses of said series, means for applying energy of said inclined portions to the sweep circuit of said oscillograph, and means for changing the inclination of said inclined portions to obtain the desired degree of expansion of the pulse shape viewable on the oscillograph, the means for changing the inclination of the inclined portions including means to change the frequency of said wave and means to change the amplitude of said wave.

DONALD D. GRIEG.

REFERENCES CITED

The following references are of record in the file of this patent:

UNITED STATES PATENTS

| Number | Name | Date |
|---|---|---|
| 2,368,448 | Cook | Jan. 30, 1945 |
| 2,368,449 | Cook | Jan. 30, 1945 |
| 2,375,709 | Thompson | May 8, 1945 |
| 2,089,430 | Roys et al. | Aug. 10, 1937 |
| 2,132,655 | Smith | Oct. 11, 1938 |
| 2,088,495 | Swedlund | July 27, 1937 |
| 2,189,549 | Hershberger | Feb. 6, 1940 |
| 2,181,568 | Kotowski et al. | Nov. 28, 1939 |
| 2,215,197 | Sherman | Sept. 17, 1940 |
| 2,059,004 | Leeds | Oct. 27, 1936 |
| 2,300,189 | Wolff | Oct. 27, 1942 |